Figure 1:
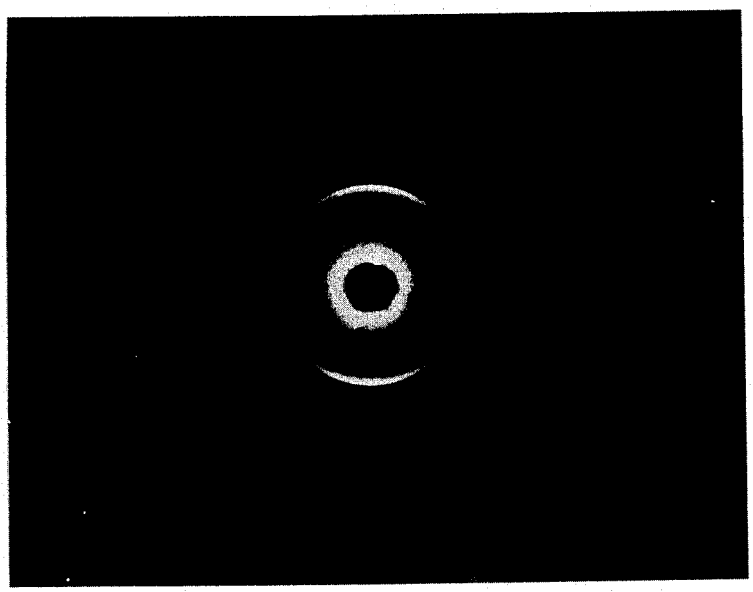

Oct. 15, 1963  C. E. FORD ETAL  3,107,152
FIBROUS GRAPHITE
Filed Sept. 12, 1960

INVENTORS
CURRY E. FORD
CHARLES V. MITCHELL
BY
ATTORNEY

United States Patent Office 3,107,152
Patented Oct. 15, 1963

3,107,152
FIBROUS GRAPHITE
Curry E. Ford, New Canaan, Conn., and Charles V. Mitchell, Shaker Heights, Ohio, assignors to Union Carbide Corporation, a corporation of New York
Filed Sept. 12, 1960, Ser. No. 55,502
10 Claims. (Cl. 23—209.2)

This application is a continuation-in-part of U.S. application Serial No. 781,186, filed December 18, 1958, now abandoned.

This invention relates to fibrous graphite and to methods for preparing the same. The term "fibrous graphite" as used herein, refers to graphite in the form of filaments, yarn or wool, woven fibrous graphitized structures and other graphitized textile forms such as knits or braids.

Graphite is a material which is a good conductor of heat and electricity, extremely resistant to high temperatures and also highly resistant to attack by most chemical reagents. Accordingly, graphite is an extremely important and useful material in industry in a great variety of applications.

Graphite appears in nature as one of the two naturally occurring forms of crystalline carbon, the other being diamond. Natural graphite occurs usually as a black soft mass or as crystals of a flaky structure.

In addition, graphite may be artificially manufactured. Almost all the artificial graphite which is made today is prepared according to the teaching first set forth by E. G. Acheson in 1896. Acheson's process, which was the first successful process for the commercial production of artificial graphite articles, has of course been somewhat modified since that time. Today it is well known in the art that almost any amorphous carbon can be converted to a useful form of graphite in an electric furnace. As a general rule, however, artificial graphite articles are fabricated from either a lampblack or a petroleum coke base material.

Relatively small graphite articles such as electrical brush stock are usually made from a lampblack base. This process comprises intimately mixing raw lampblack with coal tar or pitch and briquetting the mixture. These briquettes are calcined at about 1000° C. in order to remove all volatiles and to pre-shrink the lampblack. Following the calcination, the briquettes are milled to a fine flour which is mixed with a coal tar pitch binder. The resultant mixture is molded to shape and initially baked at about 1000° C. to carbonize the binder, and finally baked at about 3000° C. in an electric furnace to graphitize the stock. Brush stock so produced may vary in size from about ½ pound to as much as 5 or 6 pounds.

Larger graphite articles such as electrodes for electric furnaces are generally made from petroleum coke base material. The process for their manufacture comprises calcining green petroleum coke to remove all volatiles, crushing the calcined material to a small particle size and milling a portion of this into a fine flour. The resultant particles and flour are blended to form an aggregate which is mixed with a pitch binder and extruded into the desired shape. The resultant shaped article is baked at about 1000° C. and is subsequently graphitized at 2500° C.–3000° C. in an electric furnace. Graphite electrodes so produced are routinely commercially available in sizes up to 40 inches in diameter.

When either of the above methods is followed, a shaped graphite article is produced, or graphite stock is produced which may be shaped to the desired article by machining or other similar physical processes.

In contrast to these shaped artificial graphite articles, the prior art has also provided carbon filaments for use in incandescent lighting.

Thomas A. Edison was the first to successfully employ carbonized filaments of a cellulosic origin for incandescent lighting. His preferred filaments for use in electric light bulbs were prepared by dissolving good, clean, commercial cotton or other natural cellulose in some suitable solvent, usually a solution of zinc chloride, and squirting the resulting mass through a die into a fluid hardener. The resulting filament was dried, cut into lengths, and carbonized by heating out of contact with air at such temperatures as could readily be obtained in a gas furnace. The filament in this condition is known as a base filament and consists of carbon in a form very like dense hard charcoal. As the art progressed, it became the usual practice to "flash" this base filament by immersing it in a hydrocarbon vapor such as vapor of benzene and passing an electric current of such magnitude through it as to raise it to a temperature such as to cause decomposition of the hydrocarbon and deposition of the resulting carbon or carbon compound on the filament. This coating or deposit from the hydrocarbon vapor consisted principally of pyrolytic carbon.

In 1909, W. R. Whitney disclosed a highly successful process for graphitizing cellulosic fibers for use as incandescent lamp filaments. Whitney's graphitized lamp filaments were an improvement in the art over the flashed base filaments discussed above. In fact, the flashed base filaments were used as the starting material in the process of Whitney. Restated, the ordinary incandescent filament prior to the teaching of Whitney was a composite filament comprising a slightly impure dense hard carbon base surrounded by a shell or coating of pyrolytic carbon. Whitney improved the characteristics of this filament by heating it at extreme temperatures in a carbon tube electric furnace. Whitney reported that the temperatures employed were of the magnitude of 2300° C.–3700° C. and higher. This high temperature firing changed the outer shell to a different form of graphite which had a metallic temperature resistance characteristic and a specific resistance of less than 160 micro-ohm-cm. The outer shell alone made the best filament but is was impossible to remove the outer shell from the base in suitable lengths to act as filaments, presumably due to brittleness of the outer shell.

The smallest filaments produced for incandescent lighting purposes had a diameter similar to that of horsehair and were comparable in stiffness to broom straw. In fact, due to the lack of pliability in such filaments, it was necessary to shape them prior to graphitization.

It may therefore be seen that the prior art teaches methods for providing artificial graphite in the form of shaped articles of large size and in the form of single filaments, generally for use in incandescent lighting. It would be readily appreciated by one skilled in the art that the usefulness of artificial graphite could be greatly expanded if it was possible to produce such graphite in other forms than those outlined above.

Accordingly, one of the principal objects of the invention is to provide artificial graphite possessing all its attendent unique electrical, chemical and mechanical properties in the form of a textile material.

Another object of the invention is to provide a method for graphitizing pre-woven cellulosic textile structures.

Still another object of the invention is to provide a method for graphitizing flexible filaments of a cellulosic material which may be woven subsequent to graphitization.

The objects of the invention are accomplished by flexible fibrous graphite in the form of graphitized textile fabrics and graphitized monofilaments. In accord with the instant invention, it has been found that woven and non-woven cellulosic fibers can be graphitized directly to produce electrically conductive, chemically-resistant, graphitized fibers having high strength and flexibility. The invention comprises fibrous graphite and a method of producing it.

Figure 2:
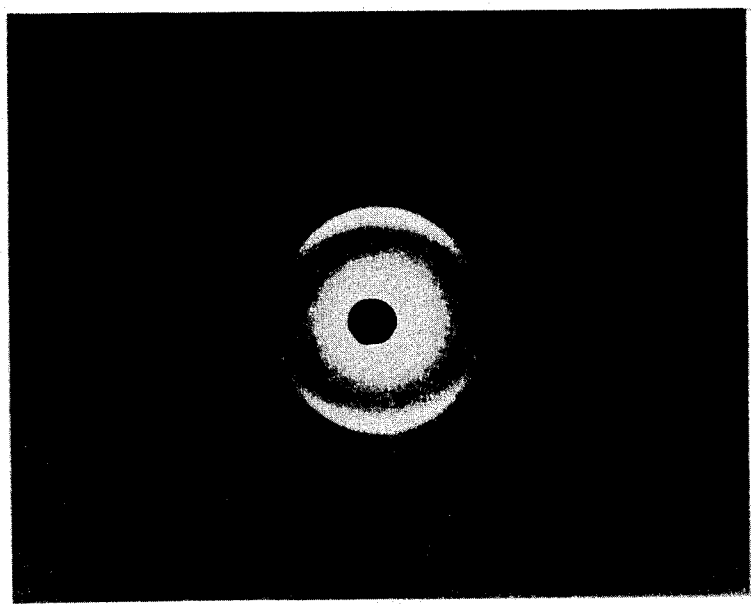

In the accompanying drawing,

FIG. 1 is the X-ray diffraction pattern of a graphitized commercial lamp filament similar to the type prepared according to the teaching of Whitney; and FIG. 2 is the X-ray diffraction pattern for typical graphitized monofilaments of this invention.

In the practice of the method of the invention, the cellulosic material to be graphitized is subjected to a carefully controlled heating schedule until substantially complete graphitization has taken place. This essential heating schedule comprises a slow heating rate of about 10° C. rise per hour to 50° C. rise per hour at a temperature of about 100° C. to about 400° C., followed by a heating rate of up to 100° C. rise per hour to a temperature of about 900° C., followed by further heating until substantial graphitization of the cellulosic starting material has occurred. The preferred heating schedule comprises a slow heating stage at temperatures ranging from about 100° C. to about 300° C. at a rate of increase of from about 10° C. per hour to about 50° C. per hour, follower by a second heating stage from about 300° C. to 400° C. which is conducted at approximately the same rate or at a 5 to 10 percent faster rate. From 400° C. to about 900° C. heating rates of up to 100° C. rise per hour are employed. From 900° C. to about 3000° C. rapid heating rates up to 3000° C. per hour may be employed. The cellulosic material is preferably positioned in a suitable protective enclosure while passing through the above-described ranges. For example, a metal sagger may be employed while passing through the room temperature to 900° C. range and a graphite capsule is suitable for the 900° C. to 3000° C. range. A protective atmosphere of nitrogen or other inert gases is desirable when passing through the 900° C. to 3000° C. range.

The method of the invention is generally applicable to all cellulosic materials, both woven and unwoven. Among suitable materials are rayon fibers, rayon cord, and viscose rayon cloth.

Woven and non-woven graphitized material prepared as above combine the unique properties of graphite with a flexible structure in a textile form and such material is useful in countless applications. Woven material so treated is available for immediate use; filaments so treated can be shaped into any textile form such as yarns, braids, knits or weaves and can also be felted. The graphitized material has excellent thermal and electeical conductivity, and being in flexible form is immune to thermal shock. These unique properties to some degree are imparted to other materials such as non-conducting materials as plastics and ceramics and to other textile materials such as glass cloth by incorporating the graphitized material therein. The graphitized material of the subject invention is useful for manufacturing thermal, acoustical and vibrational insulation for high temperature, non-oxidizing conditions. Also, electrically conducting, self-lubricating, chemically resistant high temperature packaging, gaskets, screens, grids, and filter cloth, are fabricated from the product of the instant invention.

In the electrical field, flexible graphite cloth resistance heating elements deliver heat wherever it is needed, at either high or low temperatures. On the low temperature side, such elements would be useful as wall panel units for space heating or for heating clothing for a variety of uses. By plating spraying or by vacuum deposition methods a metallic coating may be provided on the graphite cloth, to which coating electrical connections can be made quite easily. In the electronics industry, graphitized filaments may be used as thermoelectric elements in vacuum tube grids and infrared emitters. Carbon or graphite brushes are rendered more conductive by incorporation therein of the subject graphite cloth or fibers. The graphitized material is excellent for high temperature applications, such as in missile nose cones.

As stated above, the invention contemplates the graphitization of both filaments or yarns and pre-woven structures. As an example of the embodiment of the invention which utilizes pre-woven material, a square woven belting duck cloth 3300/1440 was heated at 10° C. per hour rate of temperature rise from 100° C. to 450° C. then at 60° C. per hour to 900° C., followed by a one hour hold period at 900° C., and finally graphitized at 2900° C. The first number identifying the fiber represents the denier or weight of the yarn, while the second number indicates the number of monofilaments in the yarn. The physical and chemical properties of the treated material are tabulated below:

Physical properties:
  Wt./sq. foot_____ 0.04 lb.
  Tensile strength (room temperature)_____ 3–20 lbs./in. in either direction.
  Electrical resistance (room temperature)_ 0.52 ohm/in. width/in. length.
  Melting point_____ None.
  Sublimation temp____ Above 5250° F. (manufactured graphite sublimes at approximately 6600° F. at ordinary pressures).
  Resistance to abrasion _____ Cloth marks paper similar to medium lead pencil.
  Flexibility _____ Cloth may be repeatedly folded and creased without failure.

Chemical properties:
  Ash _____ 0.09 percent.
  Spectrographic analysis of ash_____ No major impurities. High minor impurities: Mg. Low minor impurities: Al. High trace impurities: Mn, ca, Fe, and S. Minor trace impurities: Na, N, Cu and B.
  Chemical resistance___ Resistant to practically all acids, alkalies and organic compounds except those of high oxidizing character and is unreactive with many metals (e.g. Zn, Al, Mg, Cu and Cu alloys) and metal producing slags at their melting points.

As an example of the embodiment of the invention which utilizes non-woven filaments or yarns, three viscose rayon yarn materials, namely 1100/720 tire cord, 1100/480 yarn and a 900/50 yarn were heated according to the specified schedule of the invention and the cross section, tensile strength and specific resistance values were determined for the individual monofilaments of the yarns after graphitization at 2900° C. and these are listed in the table below. During heating, the yarns were supported in a variety of ways such as by being wound around a ceramic beaker, metal plate or metal frame, or were unsupported, being bunched in random orientation. Also found in the table below are similar data on graphitized monofilaments of the prior art.

TABLE

*Properties of Monofilaments*

| Material | Diameter, microns | Tensile Strength, pounds per square inch | Specific Resistance, micro-ohm-cm. |
|---|---|---|---|
| Invention: | | | |
| (a) 1100/720 | 5-7 | 108,000-130,000 | 2,000-5,400. |
| (b) 1100/480 | 6.5-8.5 | | 2,100-2,500. |
| (c) 900/50 | 20-25 | 48,000-53,000 | 1,900-4,500. |
| Edison | 25.4-158 | Unknown | Unknown. |
| Whitney | 20-160 | Unknown | Less than 160. |
| Commercial Lamp Filaments [1]: | | | |
| (a) | 146 | 28,000-33,000 | 4,060. |
| (b) | 205 | 18,500-22,000 | 4,400. |
| (c) | 500 | | |

[1] Bought from F. J. and J. Planchon, 78 Rue Lacondamine, Paris, France, and presumably made by process very similar to Edison and Whitney.

During data taking, it was noted that the graphitized fibers were stronger and more electrically conductive than were carbonized fibers. This is quite contrary to the usual experience in the carbon industry where the situation is that graphite is weaker than carbon; a fact which would normally lead one to conclude that the graphitized fibers would be generally considerably weaker than carbonized fibers which in turn would be considerably weaker than untreated fibers. A unique property of the graphitized tire cord is that resiliency is imparted thereto after graphitization.

While pre-woven flexible graphitized textile material was unknown to the art, it has also been determined by the applicants that the graphitized filaments which are produced by following the teaching of this invention are unique when compared with the carbon or graphite filaments of the prior art, and this is well brought out in the data of the above table. This is not altogether surprising when one compares the teaching of the prior art with the teaching of the invention. As explained above, the pyrolytic layer on the filaments of Edison and Whitney was deposited by a flashing treatment wherein the base filament was immersed in a hydrocarbon vapor, and an electric current of such magnitude was passed through the filament to raise it to a temperature which caused the decomposition of the hydrocarbon and deposition of the resulting carbon on the filament, thus producing a two-phase structure. In contrast, by this invention the cellulosic material is directly graphitized according to a specific heating schedule.

In addition to being highly flexible, as compared to the filaments of the prior art, the graphitized filaments of the invention differ from those of the prior art in at least four major properties, and it is perhaps these differences which account for their great flexibility. As shown in the table, the cross section of the filaments of the invention range from 5 to 25 microns, while those of Whitney, Edison and other lamp monofilaments range from 20 to 500 microns. The specific resistance of the filaments of the invention is in the range of from approximately 1800-5500 micro-ohm-centimeters. In contrast, Whitney identified his filaments as filaments of artificial graphite having a specific resistance of less than 160 micro-ohm-centimeters. The tensile strength of the monofilaments of the invention is much higher than the tensile strength of the filaments of the prior art. Due to the small diameter of the filaments tested, special techniques had to be devised for determining the tensile strengths. The tensile strength of the prior art filaments was determined by suspending a filament two inches long from a rigid hook and pouring sand into a paper bucket secured to the other end of the filament until the specimens broke. The bucket was weighed, and the diameter of the filament was measured with a microscope containing a calibrated scale in one eyepiece, and from this the cross-sectional area was computed. The even smaller diameter filaments of the invention were tested as follows: small paper cards were secured to each end of ¼ inch long filaments. The upper card was suspended from the left arm of an analytical chain type balance while the lower end was secured to a hook attached to a micromanipulator. Known weight was added to the right side of the balance, the balance being kept level, until the test specimen broke. The cross-section of the filament was computed in the same manner as above. In addition to the above, X-ray diffraction patterns were taken in the conventional manner on filaments which were made by a process similar to the process of Whitney and on filaments of the invention. The existence of a preferred orientation of crystallites is deduced from the fact that the maximum in the scattered radiations occur along arcs rather than full circles concentric with the undeviated beam. The shorter the arcs, the more highly oriented are the crystallites.

Referring now to FIG. 1, inspection of the inner ring of the X-ray pattern of the prior art filament shows that there are two distinct phases present. Phase 1 gives rise to a fairly broad, diffuse halo in which the scattered X-ray intensity is evenly distributed around the circle. Phase 2 gives rise to very clearly defined, narrow lines in the form of short arcs. There is clearly a rather high degree of preferred orientation in phase 2 which is also highly graphitic (or highly crystalline). The second phase is believed to be due to particles of coke or graphite added to and mixed with the cellulose paste prior to extrusion of the filament. The extrusion presumably oriented these particles, just as orientation is always produced during extrusion of green mixes in the commercial production of extruded carbon shapes. The first phase is graphitized cellulose and no preferred orientation exists.

In direct contrast is the X-ray diffration pattern of the filament of the invention (FIGURE 2), wherein a high degree of preferred orientation exists throughout the entire filament as shown by broad lines in the form of short arcs. It is believed that it is this high degree of uniformly orientated crystallinity which in part accounts for the superior strength of the monofilaments of the invention.

We claim:

1. A process for producing flexible fibrous graphite from cellulosic material, comprising heating such material according to a heating schedule comprising a slow heating rate of about 10° C. rise per hour to 50° C. rise per hour from a temperature of about 100° C. to about 400° C. followed by a heating rate of up to 100° C. per hour to a temperature of about 900° C. followed by further heating until substantial graphitization thereof has occurred.

2. The process of claim 1 wherein said cellulosic material is monofilaments of rayon.

3. The process of claim 1 wherein said cellulosic material is a prewoven rayon textile material.

4. A process for graphitizing cellulosic yarns comprising heating such yarns according to a heating schedule comprising a slow rate of temperature rise of about 10° C. to 50° C. rise per hour while said yarns are between a temperature of 100° C. and 400° C., thereafter heating said yarns to about 900° C. at a rate of up to 100° C. per hour, followed by heating to about 3000° C. until substantial graphitization thereof has occurred.

5. A flexible graphitized polycrystalline monofilament of cellulosic origin having a diameter between 5 and 25 microns, a tensile strength in excess of 40,000 pounds per square inch, and a specific resistance of from 1,800 to 5,500 micro-ohm-centimeters; said graphitized monofilament substantially retaining the characteristic physical textile attributes of the ungraphitized cellulosic monofilament.

6. A multi-filament polycrystalline graphitized yarn of cellulosic origins, each filament of which has a diameter in the range of from 5 to 25 microns, a tensile strength in excess of 40,000 pounds per square inch, and a specific resistance of from 1,800 to 5,500 micro-ohm-centimeters; said yarn substantially retaining the characteristic physical textile attributes of the ungraphitized cellulosic yarn.

7. A textile material woven from the graphitized yarn of claim 6.

8. A flexible prewoven graphitized material of cellulosic origin, each filament of which has a diameter between 5 and 25 microns, a tensile strength in excess of 40,000 pounds per square inch, and a specific resistance of from 1,800 to 5,500 micro-ohm-centimeters; said prewoven graphitized material substantially retaining the characteristic physical textile attributes of the ungraphitized cellulosic prewoven material.

9. A polycrystalline graphitized fibrous textile material of cellulosic origin which substantially retains the characteristic physical textile attributes of the ungraphitized cellulosic material and which is further characterized by high tensile strength and flexibility and which possesses the property of being able to withstand repeated creasing and folding without failure.

10. The graphitized textile material of claim 9 wherein the starting textile material of cellulosic origin is rayon.

References Cited in the file of this patent
UNITED STATES PATENTS

| | | |
|---|---|---|
| 330,586 | Heisler | Nov. 17, 1885 |
| 653,887 | Robertson | July 17, 1900 |
| 916,905 | Whitney | Mar. 30, 1909 |
| 2,796,331 | Kauffman | June 18, 1957 |
| 2,957,756 | Bacon | Oct. 25, 1960 |
| 3,011,981 | Soltes | Dec. 5, 1961 |